(12) United States Patent
Kim

(10) Patent No.: US 6,811,930 B2
(45) Date of Patent: Nov. 2, 2004

(54) POST-EXPOSURE TREATMENT METHOD OF SILVER HALIDE EMULSION LAYER, HOLOGRAM MANUFACTURED USING THE METHOD, AND HOLOGRAPHIC OPTICAL ELEMENT INCLUDING THE HOLOGRAM

(75) Inventor: Jong-man Kim, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 10/154,802

(22) Filed: May 28, 2002

(65) Prior Publication Data

US 2002/0192567 A1 Dec. 19, 2002

(30) Foreign Application Priority Data

May 30, 2001 (KR) ........................................ 2001-30084

(51) Int. Cl.[7] ............................. G03C 5/29; G03C 5/38; G03C 5/44; G03C 5/26
(52) U.S. Cl. ............................... 430/1; 430/2; 430/290; 430/418; 430/426; 430/427; 430/430
(58) Field of Search ................................ 430/1, 2, 418, 430/426, 427, 290, 430

(56) References Cited

U.S. PATENT DOCUMENTS

| 4,187,106 A | * | 2/1980 | Gladden | ........................ 430/1 |
| 4,904,554 A | * | 2/1990 | Wreede | ......................... 430/2 |
| 5,795,681 A |   | 8/1998 | Muller et al. | |

FOREIGN PATENT DOCUMENTS

| EP | 0 334 245 A2 | 9/1989 |
| EP | 1262827 | * 12/2002 |
| WO | WO 94/18603 | 8/1994 |

OTHER PUBLICATIONS

J. Kim, et al., *Holographic optical elements recorded in silver halide sensitized gelatin emulsions. Part 1. Transmission holographic optical elements*, Applied Optics, vol. 40, No. 5, Feb. 2001, pp. 622–632, United States.
A. Fimia. et al., *Silver halide sensitized gelatin as a holographic recording material*, Optics & Laser Technology, vol. 27, No. 5, Oct. 1995, pp. 285–292, The Netherlands.
D. Angell, *Improved diffraction efficiency of silver halide (sensitized) gelatin*, Applied Optics, vol. 26, No. 21, Nov. 1987, pp. 4692–4702, United States.

* cited by examiner

*Primary Examiner*—Richard L. Schilling
(74) *Attorney, Agent, or Firm*—Burns, Doane, Swecker & Mathis, L.L.P.

(57) ABSTRACT

A post-exposure treatment method of a silver halide emulsion layer in the manufacture of a hologram, a hologram manufacturing using the post-exposure treatment method, and a holographic optical element including the hologram are provided. The post-exposure treatment method of a silver halide emulsion layer involves: pre-hardening the silver halide emulsion layer after exposure; developing the pre-hardened silver halide emulsion layer using a developer solution; bleaching the developed silver halide emulsion layer; hardening the bleached silver halide emulsion layer; drying the hardened silver halide emulsion layer; surface-hardening the dried silver halide emulsion layer; fixing the hardened silver halide emulsion layer; treating the fixed silver halide emulsion layer using warm water; and drying the silver halide emulsion layer which has been treated using warm water.

47 Claims, 5 Drawing Sheets

POST-EXPOSURE TREATMENT METHOD OF SILVER HALIDE EMULSION LAYER, HOLOGRAM MANUFACTURED USING THE METHOD, AND HOLOGRAPHIC OPTICAL ELEMENT INCLUDING THE HOLOGRAM

Priority is claimed to patent application No. 2001-30084 filed in Rep. of Korea on May 30, 2001, herein incorporated by reference.

BACKGROUND OF THE INVENTION

1. Field of the Invention

The present invention relates to a post-exposure treatment method of a holographic recording material, and more particularly, to a post-exposure treatment method of a silver halide emulsion layer in the manufacture of a hologram, a hologram manufactured using the post-exposure treatment method, and a holographic optical element (HOE) including the hologram.

2. Description of the Related Art

Holographic optical elements (HOEs) are recorded in dichromated gelatin (DCG) known to have a high efficiency and low noise characteristics. However, DCG suffers a low sensitivity and poor color reproducibility. Therefore, it is not easy to manufacture a full-color hologram or HOE using the DCG.

For this reason, research on photopolymer or other holographic recording materials has been continuously performed. A silver salt-containing silver halide material and a treatment process thereof have become more interesting in recent years.

As a result of efforts made to attain similar or superior properties to the DCG, a new treatment technique called a "silver halide sensitive gelatin (SHSG) process" has been established.

Some research institutes reported that this SHSG process provides a 90% efficiency for transmission HOEs. The SHSG process is characterized as leading a low noise and high efficiency. Also, the residue from the SHSG process is pure gelatin, so there is no problem of print-out.

SHSG techniques developed so far have been applied for recording with holographic materials available from Agfa, Kodak, and liford, causing a problem of scattering during recording. No scattering is observed when applied to the DCG or photopolymers.

The recent development of some sorts of ultra-fine grain silver halide emulsion has increased an interest in the SHSG technique. This is because the SHSG technique is expected to provide comparable effects with the DCG when applied to an ultra-fine grain silver halide emulsion. However, there hasn't been reported yet a SHSG technique capable of effecting similar properties to the DCG or photopolymers.

Briefly, the SHSG technique involves exposing and locally tanning a silver halide emulsion layer. Then, silver salt or silver in the emulsion layer diffuses out due to fixing, so that only pure gelatin remains. In the last step, the remaining gelatin is dehydrogenated using a hydrophilic organic solvent. The dried SHSG hologram includes only gelatin and microvoids of air. Like this, since the internal component of the dried SHSG hologram varies and refractive indexes of the two components differ, that is, the gelatin has a refractive index of 1.5, and the air filling the microvoids has a refractive index of 1.0, the refractive index of the SHSG hologram with respect to incident light varies. The SHSG hologram or a HOE including the SHSG hologram (hereinafter, referred to as an "SHSG HOE") operates using the variation of refractive index.

SHSG holograms or SHSG HOEs are categorized into a transmission type or a reflection type according to the transmittance of the hologram at recording or reproduction. It has been known that the reflection type SHSG hologram is more difficult to manufacture than the transmission type SHSG hologram.

A reflection type SHSG hologram having an efficiency of 40–70% has been reported. Also, a reflection type SHSG hologram having an efficiency of 80% was reported in Russia. However, this level of efficiency is impractical. These conventional reflection type SHSG holograms have a problem of the reliability of recording materials or processing reproducibility. This is associated with the fact that the reflection type SHSG hologram or reflection type SHSG HOE has an end structure of multiple layers including a pure gelatin layer and a microvoid layer, which is difficult to be kept intact.

Gelatin or a silver halide emulsion easily swells, collapses, or shrinks during processing. Therefore, it is difficult to keep a fringe that is an interference pattern formed during recording. Thus, a SHSG hologram with excellent quality cannot be manufactured using the gelatin or silver halide emulsion.

An SHSG process using a red sensitive BB-640 emulsion (ultra-fine grain silver halide emulsion) having a grain size of 25 nm was reported by Blendze and Neipp. The SHSG process provides an improved efficiency above 90%, compared to 40% for an Agfa's product and 85% for a simple BB640 emulsion.

Bledze reported an efficiency of 90% using a red-sensitive PFG-01 emulsion. Usanov succeeded in manufacturing a reflection type hologram through reversal solvent bleaching with an efficiency of 80% for each wavelength of the R, G, B colors. However, his disclosure was not fully described, and the efficiency is not high enough for practical use.

Holographic recording materials that have been developed or reported as having been developed so far, such as DCG or photopolymer, fail to fully meet the requirement of characteristics. The DCG has excellent efficiency, signal-to-noise ratio (S/N), and long-term reliability, but very low photosensitivity and spectral sensitivity. Therefore, the DCG has limited applications. The photopolymer is excellent in most characteristics, but is slightly unstable and difficult to handle. Up to now, no photopolymer has been produced on an industrial scale.

Common silver halide emulsions have been found to be inferior to the DCG or photopolymer in all of the characteristics. There has not been reported any SHSG process capable of providing a comparable effect to the DCG or photopolymer using ultra-fine grain silver halide emulsion.

SUMMARY OF THE INVENTION

To solve the above-described problems, it is an object of the present invention to provide a post-exposure treatment method of a silver halide emulsion layer, capable of providing excellent spectral sensitivity, energy sensitivity, efficiency, signal-to-noise ratio, and long-term reliability as well as the advantages of conventional silver halide, dichromated gelatin (DCT), and photopolymers.

It is a second object of the present invention to provide a hologram manufactured using the post-exposure treatment method and a holographic optical element (HOE) employing the hologram.

To achieve the first object of the present invention, there is provided a post-exposure treatment method of a silver halide emulsion layer in the manufacture of a hologram, the method comprising: pre-hardening the silver halide emulsion layer after exposure; developing the pre-hardened silver halide emulsion layer using a high-contrast developer solution; bleaching the developed silver halide emulsion layer; hardening the bleached silver halide emulsion layer; drying the hardened silver halide emulsion layer; surface-hardening the dried silver halide emulsion layer; fixing the hardened silver halide emulsion layer; treating the fixed silver halide emulsion layer using warm water; and drying the silver halide emulsion layer which has been treated using warm water.

In pre-hardening the silver halide emulsion layer, preferably, a mixture of an organic solvent including an aldehyde group, potassium bromide, sodium carbonate, and deionized water in a predetermined ratio is used.

In bleaching the developed silver halide emulsion layer, preferably, a hardening agent of 1–8% for cross-linking gelatin in the silver halide emulsion layer and a rehalogenate-bleaching agent containing a basic substance of 0–5% for the adjustment of pH are used.

In hardening the bleached silver halide emulsion layer, the bleached silver halide emulsion layer can be thermally treated to harden gelatin in the bleached silver halide emulsion layer. Preferably, the bleached silver halide emulsion layer is left in warm water, a high-temperature and high-humidity atmosphere, or a microwave oven for a predetermined period of time to facilitate the cross-linking of the gelatin.

Preferably, before bleaching the developed silver halide emulsion layer, the post-exposure treatment method according to the present further comprises treating the developed silver halide emulsion layer in a stop bath, for example, using acetic acid for 30–120 seconds.

In the post-exposure treatment method according to the present invention, drying the hardened silver halide emulsion layer can comprise: treating the hardened silver halide emulsion layer using a dilution of an organic solvent with water, preferably in a 50:50 ratio, for a predetermined period of time, preferably 2–3 minutes and then 100% of the organic solution for a predetermined period of time, preferably 2–3 minutes, and drying the resultant structure; drying the resultant structure in an oven at a temperature, preferably of 45° C., for a predetermined period of time, preferably 5 minutes. The organic solvent can be ethanol or IMS (Industrial Methylated Spirit).

In surface-hardening the dried silver halide emulsion layer, preferably, the surface of the dried silver halide emulsion layer is thermally treated after surface coating of the dried silver halide emulsion layer using one of an aldehyde-containing solution and a metol- or quinol-containing organic solvent for a predetermined period of time, or is thermally treated within a sealed container under the atmosphere of a vapor of the aldehyde-containing solution or metol- or quinol-containing solution for a predetermined period of time.

Alternatively, in surface-hardening the dried silver halide emulsion layer, the surface of the dried silver halide emulsion layer can be coated with one of an aldehyde-containing solution and a metol- or quinol-containing organic solvent and then thermally treated using a microwave oven for a predetermined period of time.

In fixing the hardened silver halide emulsion layer, preferably, a 2–10% dilution of a fixing solution is used to form microvoids. Preferably, the fixing solution comprises one selected from the group consisting of ammonium thiosulfate, sodium thiosulfate, ammonium thiocyanate, and a 1:2–2:20 dilution of ILFORD rapid, and an anti-swelling agent for suppressing collapsing of the microvoids and swelling of gelatine.

In treating the fixed silver halide emulsion layer using warm water, preferably, the fixed silver halide emulsion layer is treated using warm water of 30–80° C. for 1–10 minutes.

Preferably, drying the silver halide emulsion layer that has been treated with warm water in the post-exposure treatment method according to the present invention comprises: sequentially treating the silver halide emulsion layer which has been treated with warm water using a mixed organic solvent, pure organic solvent, and high-temperature organic solvent, preferably, not less then 70° C.; and slowly exposing the treated silver halide emulsion layer to air so that water remaining in the microvoids and gelatine of the silver halide emulsion layer is displaced by air. In this case, preferably, the mixed organic solvent comprises 40–80% of an organic solvent and 60–20% of water. The organic solvent can be isoproanol.

When water and the organic solvent remain in the microvoids after the drying, preferably, the silver halide emulsion layer that has been exposed to air is dried in an oven, preferably, not less than 40° C., or in a vacuum oven for a predetermined period of time, to completely remove water and the organic solvent remaining in the microvoids.

Preferably, the post-exposure treatment method according to the present invention further comprises, after drying the silver halide emulsion layer which has been treated with warm water, coating the surface of exposed gelatine with solvent-free epoxy or UV curable cement, or sealing the surface of exposed gelatine with glass, polyester, acrylic, or triacetate film.

The second object of the present invention is achieved by transmission and reflection holograms for both monochromic and color display, transmission and reflection holographic optical elements, a high-efficiency full-color hologram grating element, monochromic and color hologram reflectors, an edge-lit hologram and an HOE having the edge-lit hologram, an evanescent wave hologram and an HOE having the evanescent wave hologram, monochromic and color hologram diffusers, monochromic and color hologram screens, a color filtering device, a dichroic mirror and filter, a hologram using IR or near IR and a holographic IR optical element having the hologram, and a holographic IR optical element operating using light having a wavelength shifted from the wavelength of recording light, all of which are manufactured using the post-exposure treatment method described above.

The second object of the present invention is achieved by optical devices including an active optical switching device, an active hologram or HOE, a compact laser, and a light amplifier, which comprise a hologram manufactured using the post-exposure treatment method described above so that microvoids of the hologram are filled with a material having a different refractive index from gelatin, a bandgap material, or a material working by potential difference, such as liquid crystals.

As described above, since the post-exposure treatment method according to the present invention is based on the conventional silver halide emulsion layer, the characteristics of dichromated gelatin (DCG) and photopolymers can be provided with better spectral sensitivity, energy sensitivity, efficiency, signal-to-noise ratio, and long-term reliability than the conventional holographic recording materials. In addition, by adjusting the temperature of treatment, the bandwidth and reproduction wavelength can be varied. The post-exposure treatment method of a silver halide emulsion layer according to the present invention is applied to manufacture a full-color hologram and HOE, other optical elements, and displays with improved efficiency, signal-to-noise ratio, bandwidth, and long-term reliability, compared to conventional holograms and HOEs.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
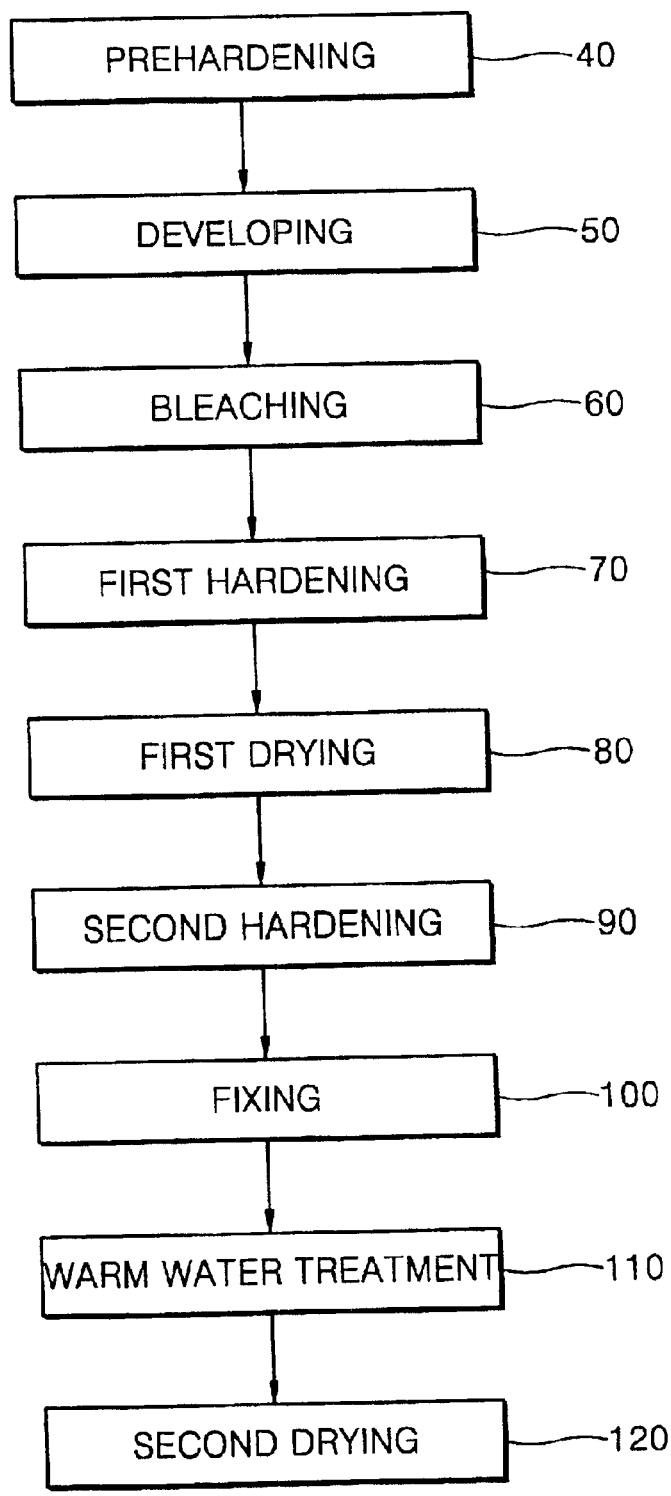
FIG. 1 is a flowchart illustrating each step of a post-exposure treatment method of a silver halide emulsion layer according to an experimental example of the present invention.

A post-exposure treatment method of a silver halide emulsion layer, a hologram manufactured using the post-exposure method, and a holographic optical element (HOE) employing the hologram according to the present invention will be described by means of the following experimental examples with reference to the appended drawings.

Hardening of a photosensitive emulsion, i.e., tanning of a protein used for hologram recording is influenced by the pH of a treatment solution for the emulsion or protein.

A common bleaching solution has a pH of 2–3. When a bleaching solution has a pH lower than this range, the effect of tanning is reduced, and the emulsion layer swells. Swelling of the emulsion layer is minimal at a pH of 4.5–5 of the bleaching solution. Therefore, there is a need to add a buffering substance to adjust the pH of bleaching solution and a hardening agent or an anti-swelling agent to adjust the hardness of the emulsion layer. For this reason, dichromate has been used as a bleaching agent in general hologram manufacturing processes using silver halide sensitized gelatine (SHSG). Chrome (Cr) ions or aluminium (Al) ions in dichromate act as a cross-linking agent for gelatine and thus hardens the emulsion layer. The pH of dichromate used as the bleaching agent is as low as 2.5–3, so that the emulsion layer seriously swells during bleaching so that yellow stains remains on the emulsion layer. This bleaching agent provides an efficiency of 90% for transmission holograms and less then 70% for reflection holograms. When the pH of the bleaching agent is increased to 5 to suppress swelling of the emulsion layer, the bleaching agent includes fewer chromic ions so that bleaching itself cannot be effectively performed.

An experiment of the present invention was focused on the adjustment of the hardness and swelling of emulsion layer before, during, and after a manufacturing process. Bleaching solutions, Organic solvents containing Cr or Al ions or an aldehyde group (H—CHO), including a formaldehyde solution, to be used as a hardening agent in the preparation of an emulsion solution or during processing, and anti-swelling agents capable of minimizing swelling of the emulsion layer were evaluated. Also, the pH of bleaching solution was adjusted in the range of 4–6 to minimize swelling of the emulsion layer.

As a result of the experiment, chrome ions were most excellent as a hardening agent for use in the preparation of a bleaching solution, and the formaldehyde solution was most suitable for both pre-hardening agent and hardening agent. Sodium sulfate was determined to be suitable as the anti-swelling agent. In addition, a warm-water treatment or high-temperature and high-humidity process applied to accelerate the function of the chromic ions during bleaching and thereby to enhance the cross-link of gelatine was effective. A difference in color reproducibility between the sample after the post-exposure treatment and untreated samples was observed.

These effects can be attained by raising the temperature of the emulsion solution to a predetermined range, for example, of 30–70° C., during bleaching. If the bleaching temperature is raised too high, the grain size and noise increase.

Also, the bandgap increases whereas the color reproducibility degrades. In the present invention, it is apparent that when the bleaching process and warm-water treatment or high-temperature and high-humidity process are separately performed, efficiency, noise and bandgap characteristics are improved.

In the experiment according to the present invention, a rehalogenating solution containing metol was used as a bleaching solution. It is found that this bleaching agent causes no stain or defect to the emulsion layer after treatment and effects hardening of the emulsion layer as the metol is oxidized. When the bleaching agent includes 1–2% of chrome ion, the cross-link of gelatine is effective, and pigments adsorbed onto the exposed portion of the emulsion layer are removed. The halogenating solution containing metol is effective in manufacturing, especially HOEs having high-spatial frequency characteristics, and causes no shrinkage of the emulsion layer during processing.

The steps of drying and surface-hardening of the emulation layer after the bleaching process now will be described. Usanov used formaline as a hardening agent in drying an emulsion layer after bleaching. When this hardening agent is used in a liquid form, the emulsion layer swells as a result of the subsequent natural drying process, and properties degrade. For this reason, hardening the emulsion layer using formaline vapor has been known as a promising technique.

A formaline solution consists of water and an organic solvent. Thus, the emulsion layer inevitably swells due to the presence of water in the formaline solution. Therefore, the temperature of vaporizing of formaline solution should be determined to be above a predetermined level, and hardening using the formaline solution should be followed by a drying process.

Suitable hardening agents include any kinds of organic solvents including an aldelyde group, and a quinol and metol in ethanol. Suitable hardening methods include leaving an emulsion layer in a container filled with vaporized hardening agent, such as vaporized formaline, at an elevated temperature for a predetermined period of time, and thermally treating an emulsion layer after coating with a hardening agent, such as formaline.

In the step of fixing, a dilute solution of ILFORD rapid fixer, sodium thiosulfate, ammonium thiosulfate, ammonium thiocyanate, etc. were used. The result shows that the adjustment of the rate of fixing according to the hardness of emulsion layer is effective in maintaining the structure of microvoids of the emulsion layer intact. To prevent swelling of the emulsion layer, which normally would occur with extended duration of fixing, a predetermined amount of sodium sulfate was added as an anti-swelling agent. As a result, an anti-swelling effect was observed with the addition of 2% of sodium sulfate.

Each step of the experiment of the present invention now will be described in greater detail with reference to FIG. 1.

Referring to FIG. 1, in Step 40, an emulsion layer is pre-hardened before the main process starts. In particular, this pre-hardening step is performed for 0–30 minutes, preferably 3–6 minutes to make the hardness of the emulsion layer. The duration of the pre-hardening step is varied depending on the initial hardness of the exposed emulsion layer.

The composition of the pre-hardening solution used is shown in Table 1.

TABLE 1

| Component | Content |
| --- | --- |
| 37% Formaldehyde (formaline) | 10 mL (10.2 g) |
| Potassium bromide | 2 g |
| Sodium carbonate (anhydrous) | 5 g |
| Deionized water | 1 L |

As shown in Table 1, the pre-hardening agent consists of a component including an aldelyde group, such as formaldehyde, potassium bromide, sodium carbonate, and deionized water. ($Cr_2(SO_4)_3 \cdot K_2SO_4$) or ($Al_2(SO_4)_3 \cdot K_2SO_4$) can be used instead of formaldehyde.

In Step 50, the pre-hardened emulsion layer is developed. A development process is crucial in the manufacture of a hologram or HOE. When an ultra-fine grain emulsion is used, any high-contrast, non-tanning developer can be used for development without quality deterioration.

In the experiment according to the present invention, the characteristics of a variety of developer solutions, including AAC, CW-2, Kodak D-19, and Agfa G282c, were evaluated. As a result, Afga G282c, which contains quinol and sulfite, has better characteristics, for example, in terms of tanning suppression, than the other high-contrast developer solutions. Based on the result of the evaluation, the pre-hardened emulsion layer was developed using Afga G282c for about 3 minutes at a temperature of 22° C.

In Step 60, the emulsion layer passed through the development process is bleached.

Prior to explanation of Step 60, a general bleaching process will be described briefly. The bleaching process associated with the manufacture of a general hologram or a SHSG process is roughly classified into two processes: reversal (solvent) bleaching and rehalogenate-bleaching. In reversal (solvent) bleaching, silver is removed from the developed emulsion layer. In halogenate-bleaching, silver in the developed emulsion layer is rehalogenated using a halogen compound (usually, potassium bromide) in the bleaching solution. The silver salt resulting from rehalogenate-bleaching has a larger particle size than the silver salt from conventional bleaching methods, and is removed in a subsequent fixing process. Therefore, halogenate-bleaching is believed to be further effective in the manufacture of reflection holograms. However, the hardness of gelatine is not great enough so that microvoids may collapse or shrink in the fixing process.

An important consideration in the bleaching of emulsion layer is the following hardening of the emulsion layer, which can be localized or uniform over the emulsion layer. As the results of many trials made by the inventor, a PBU-metol bleaching agent, which is a kind of modified rehalogenate-bleaching agent and has the following composition of Table 2, was found to have most excellent properties.

TABLE 2

| Component | Content |
| --- | --- |
| Copper bromide | 1 g |
| Potassium persulfate | 10 g |
| Citric acid | 50 g |
| Potassium bromide | 20 g |
| Borax | 30 g |
| Deionized water | 1 L |

In Table 1, the basic material of borax (di-sodium tetraborate, $Na_2B_4O_7$) is used to pH adjust to 4–6, preferably to 5. The content of borax is adjusted in the range of 0–5% (10–35 g), preferably to 30 g. The use of borax prevents swelling of the emulsion layer during bleaching.

In Step 60, the inventor bleached the emulsion layer passed through the development of Step 50 using a PBU-metol bleaching agent for 15 minutes. The PBU-metol bleaching agent used was prepared by adding 1–2% (1 g) of 4-methylaminophenol sulfate, 2,4-diaminophenol dihydrochloride, 1,4-dihydroxybenzone, or resorcinol to the PUB-metol bleaching agent having the composition of Table 2 above. Also, 1–8% of chromium (III) potassium sulfate was added as a hardening agent in the preparation of the PBU-metol bleaching agent. Any salt containing, for example, $Cr^{3+}$ or $Al^{3+}$, can be used as the hardening agent, instead of chromium (III) potassium sulfate.

In case where high-temperature treatment follows the bleaching process, the emulsion layer may be printed out by external light. To prevent this, the emulsion layer after the development and before the bleaching step is treated using 2% of acetic acid ($CH_3COOH$) in a stop bath for 30 seconds to 2 minutes. For the same purpose, the high-temperature treatment after the bleaching process can be performed in a dark room, or the pH of warm water used in the high-temperature treatment can be adjusted to be weak alkali.

In Step 70, the emulsion layer from the bleaching of Step 60 is hardened to accelerate the cross-linking of chrome or aluminium ions present in the emulsion layer into gelatine (first hardening step).

In Step 70, the bleached emulsion layer from Step 60 may be left in warm water, under a high-temperature and high-humidity atmosphere, or in a microwave oven, each for a predetermined period of time. In the experiment of the present invention, the bleached emulsion layer was treated in a 40–70° C. warm water for 3–10 minutes. The harness of gelatine can be adjusted by varying the temperature of warm water or the duration of hardening process. In another method, the bleached emulsion layer was left for 10 minutes to a few hours, but preferably 10–30 minutes, within a sealed container conditioned at a high temperature of 40–80° C. and at a high relative humidity of 60–90%. Alternatively, the bleached emulsion layer was left in a microwave oven for a few seconds to a few minutes.

In Step 80, the emulsion layer from the hardening of Step 70 is dried (first drying step). This drying step determines the wavelength of color that is produced from the complete hologram or HOE or determines the final thickness of emulsion layer. In the experiment of the present invention, variations in the final thickness of emulsion layer depending on the degree to which emulsion layer had been dried were observed.

Step 80 may include two steps. In a first step, the emulsion layer from Step 70 is treated using a predetermined organic solution diluted with water in a predetermined ratio (preferably, 50:50) for a predetermined period of time, preferably, 2–3 minutes, and then using the predetermined organic solution without dilution for a predetermined period of time, preferably, 2–3 minutes. In the experiment of the present invention, ethanol or IMS (Industrial Methylated Spirit) was used as the predetermined organic solvent. In a second step, the emulsion layer from the first step is dried in an oven at a predetermined temperature for a predetermined period of time. It is preferable that the drying temperature is 45° C. and the duration of the oven-drying is 5 minutes.

In Step 90, the surface of the emulsion layer from Step 80 is hardened (second hardening step). In particular, the surface of the dried emulsion layer was thermally treated after having been coated with an aldehyde (H—CHO)-containing solution, for example, a formaldehyde solution, for a predetermined period of time, preferably 1–10 minutes. In an alternative method, the surface of the dried emulsion layer was thermally treated within a sealed container under the atmosphere of an aldehyde-containing vapor at a predetermined temperature, preferably, 40–80° C., for 5–180 minutes, preferably 15–60 minutes. The aldelyde-containing solution and the aldehyde-containing vapor used in the alternative methods described above for second hardening of the bleached and dried emulsion layer may be replaced with a solution obtained by dissolving metol or quinol in an organic solvent, such as ethanol, and a vapor form of the metol- or quinol-containing organic solvent, respectively.

Alternatively, for second hardening of the emulsion layer after the bleaching process, the surface of the bleached and dried emulsion layer was coated with the aldehyde-containing solution or the metol- or quinol-containing organic solvent, and then thermally treated in an oven for a predetermined period of time. Preferably, the thermal treatment in the oven is performed for 1–10 minutes.

In Step 100, the emulsion layer whose surface has been hardened in Step 90 is fixed. Silver salt is removed from the emulsion layer from Step 90 so that microvoids remain in an exposure portion and a pure gelatine layer remains in a non-exposure portion.

In particular, the surface-hardened emulsion layer from Step 90 was fixed using a 2–5% dilution of a fixing solution for 2–15 minutes. The fixing solution included 10–200 g of ammonium thiosulfate, sodium thiosulfate, ammonium thiocyanate, or ILFORD rapid mixer (a 1:2~1:20 dilution), a predetermined amount of anti-swelling agent capable of preventing the microvoids from falling down and the gelatine from swelling, and 1 L of deionized water. In the experiment of the present invention, 20 g of sodium sulfate ($Na_2SO_4$) was used as the anti-swelling agent.

In Step 110, the resultant structure from the fixing step is treated in warm water to enlarge the microvoids formed in Step 100 and adjust the bandwidth of an HOE. The higher the temperature of warm water and the longer the duration of warm-water treatment, the longer the bandwidth.

In particular, the resultant structure from the fixing step was treated using warm water of 30–70° C. for a predetermined period of time, preferably 1–10 minutes.

In Step 120, the resultant structure from the warm-water treatment is dried to remove the remaining water from the emulsion layer and microvoids (second drying step). It is preferable the remaining water kept in the microvoids is displaced by, for example, air void, without deformation of the microvoids in the gelatine of the multi-layered structure described above.

The inventor tested a number of organic solvents, including ethanol, methanol, isotropanol, ethylmethylketone, and dichloromethane, so as to select a suitable organic solvent that unaffects gelatine and has a relatively high water-solubility and saturated vapor pressure. As a result, some of the organic solvents tend to remain on the emulsion layer after drying, thereby degrading the emulsion layer or substrate. Based on the result of the test, the inventor used isopropanol in drying the fixed resultant structure after the warm-water treatment.

The second drying of Step 120 was performed through two steps.

In a first step, the resultant structure from the warm-water treatment of Step 110 was sequentially treated with a mixed organic solvent, pure organic solvent, high-temperature (70° C. or greater) organic solvent, and then slowly exposed in air for drying. The mixed organic solvent and the pure organic solvent were treated at 20° C. for 5 minutes. A mixture of 40–80% organic solvent and 60–20% water, preferably, in a ratio of 50:50 was used as the mixed organic solvent. Also, isopropanol was used as the organic solvent.

In a second step, after the first step, the dehydrogenated structure was dried in an oven at a predetermined temperature, for example, 40° C., preferably, 45–60° C., for a predetermined period of time, so that water or the organic solvent remaining in the microvoids after the first step was completely removed.

Alternatively, the treatment with a high-temperature organic solvent in the first step was replaced by processing in a vacuum oven, so that the second step could be omitted. In particular, the resultant structure from the warm-water treatment of Step 110 was sequentially treated using the mixed organic solvent and the pure organic solvent in the first step, and then in a vacuum oven, without treatment with the high-temperature organic solvent. Following this, the resultant structure was slowly exposed in air for drying.

As a result, the basic post-exposure treatment of the silver halide emulsion layer is complete. To enhance the water resistance of a hologram or HOE including a hologram, the surface of gelatine was coated with solvent-free epoxy or UV curable cement or was sealed with a glass, polyester, acrylic or triacetate film.

For an HOE using different light beams to record and reproduce a hologram, for example, a holographic IR optical element that uses a red laser to record a hologram and a near infrared (IR) or IR beam shifted from the red laser to reproduce the hologram, the emulsion layer swells so as to induce such a wavelength shift. Preferably, in the first drying of the bleached emulsion layer, the emulsion layer swells to an extent so that a wavelength shift occurs and subjected to the following processes.

Figure 2:
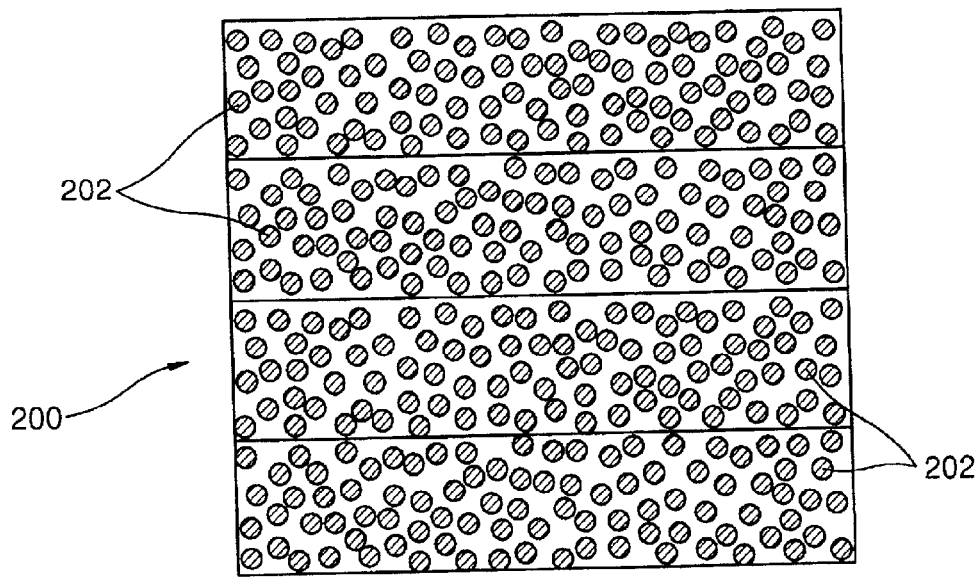
FIGS. 2 through 7 illustrates changes in the silver halide emulsion layer in each of the steps during the post-exposure treatment.
Figure 3:
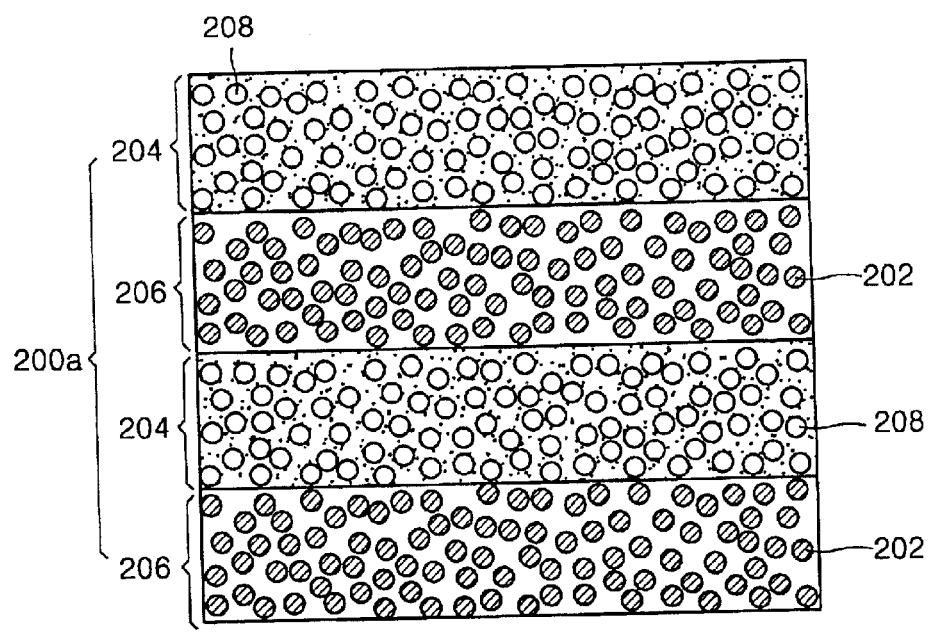
Figure 4:
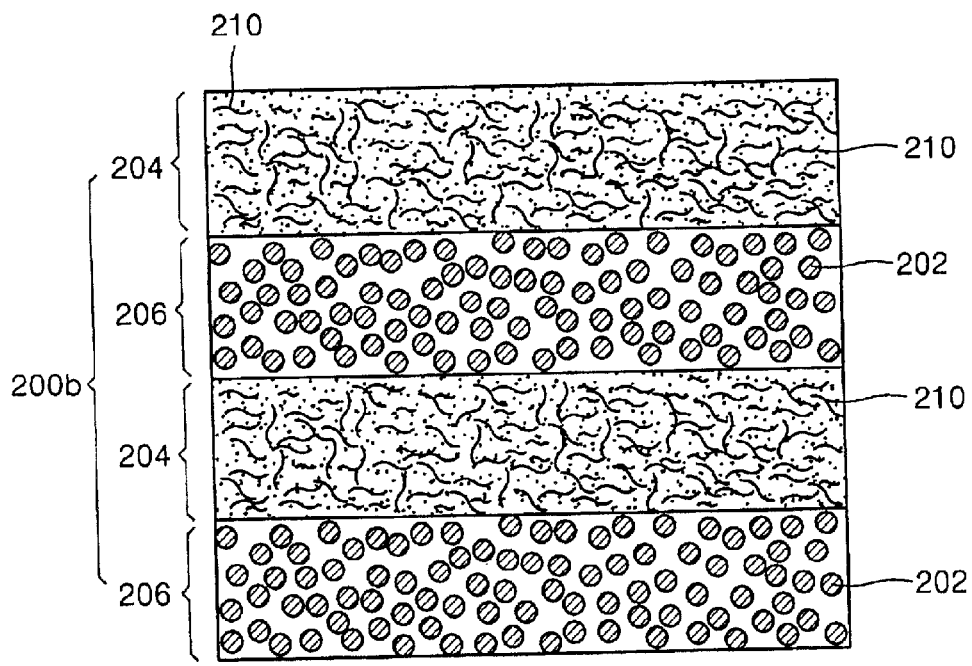
Figure 5:
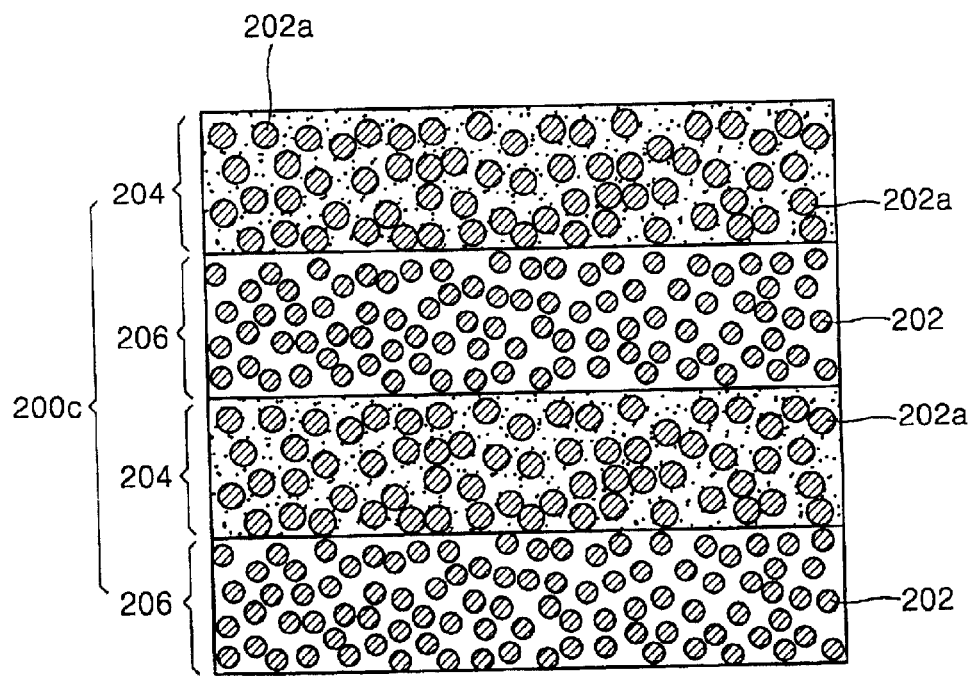
Figure 6:
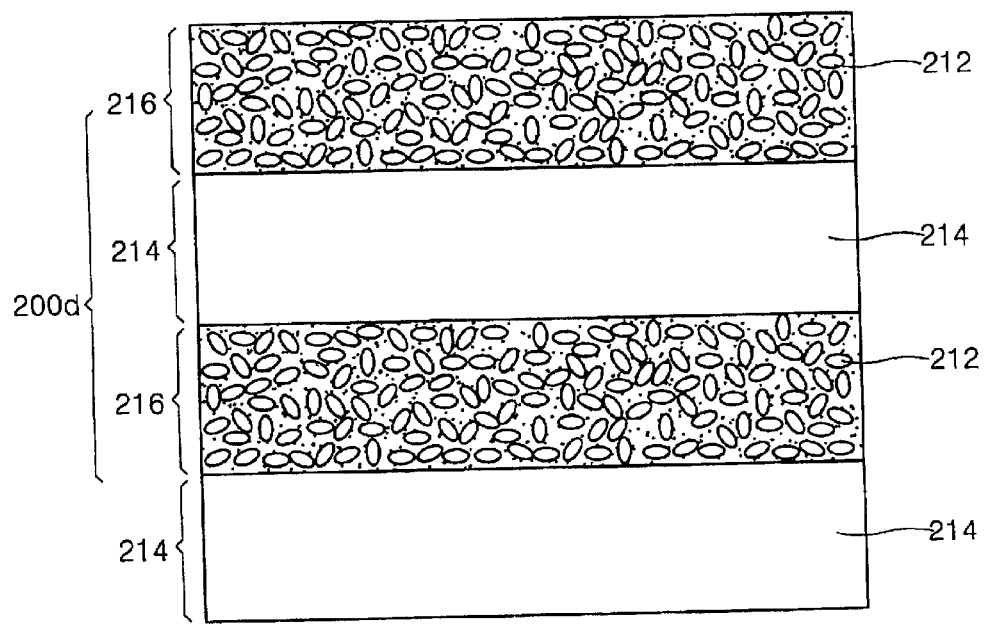
Figure 7:
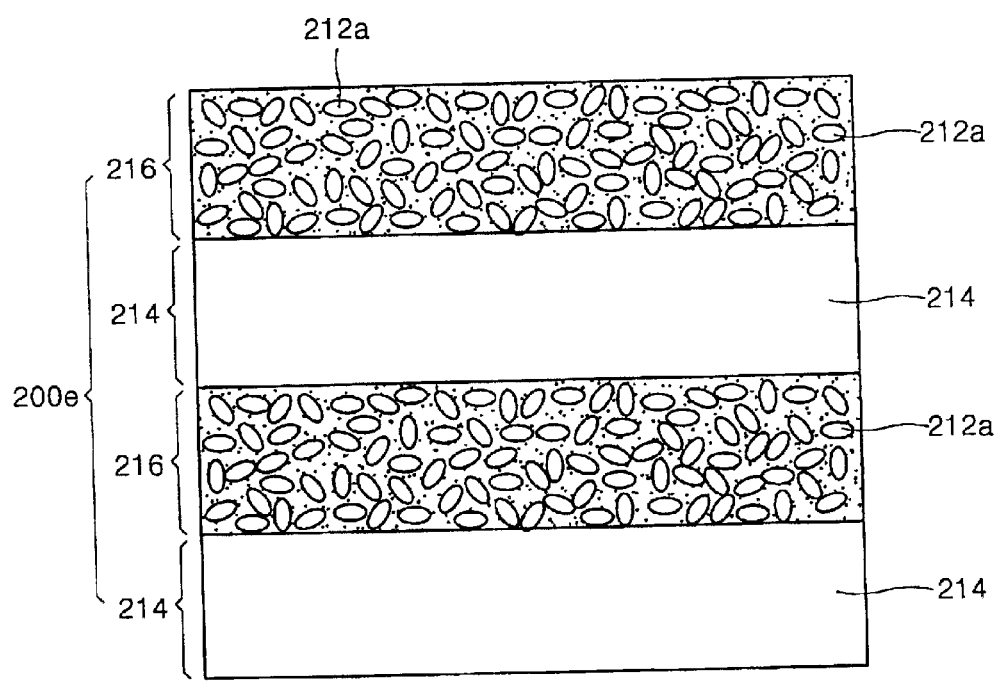

FIGS. 2 through 7 illustrate changes in the silver halide emulsion layer in each of the steps during the post-exposure treatment according to the present invention. FIG. 2 shows an emulsion layer 200 before exposure, in which silver halide grains 202 are uniformly distributed in the emulsion layer 200. FIG. 3 shows an emulsion layer 200a immediately after exposure. In FIG. 3, reference numerals 204 and 206 denote an exposure portion and non-exposure portion, respectively. Silver halide grains 202 remain intact in the non-exposure portion 206. However, in the exposure portion 204, silver halide grains 202 change to silver metal specks 206 due to a photolytic reaction. FIG. 4 shows an emulsion layer 200b after development. As a result of the development, silver filaments 210 liable to bleach are formed in the exposure portion 204. FIG. 5 shows an emulsion layer 200c after bleaching in a stop bath using a halogenate-bleaching agent, and first-drying and surface-hardening processes. In FIG. 5, recovered silver halide grains 202a appear in the exposure portion 204. FIG. 6 shows an emulsion layer 200d after fixing. As shown in FIG. 6, the recovered silver halide grains 202a (see FIG. 5) are displaced by microvoids 212 in the exposure portion 204. Also, since the silver halide grains 202 (see FIG. 2), which were distributed in an early stage, are removed from the non-exposure portion 214, a pure gelatin region 214 results in the non-exposure portion 214. As a result of the fixing process, the emulsion layer 200d has a multi-layered structure of the gelatin region 214 and the microvoid region 216. FIG. 7 shows an emulsion layer 200e that has completed the warm-water treatment and second-drying process after fixing. In FIG. 7, reference numeral 212a denotes microvoids formed in the microvoid region 216 after the warm-water treatment and final drying process, which appear to be enlarged from the microvoids 212 of FIG. 6.

Figure 8:
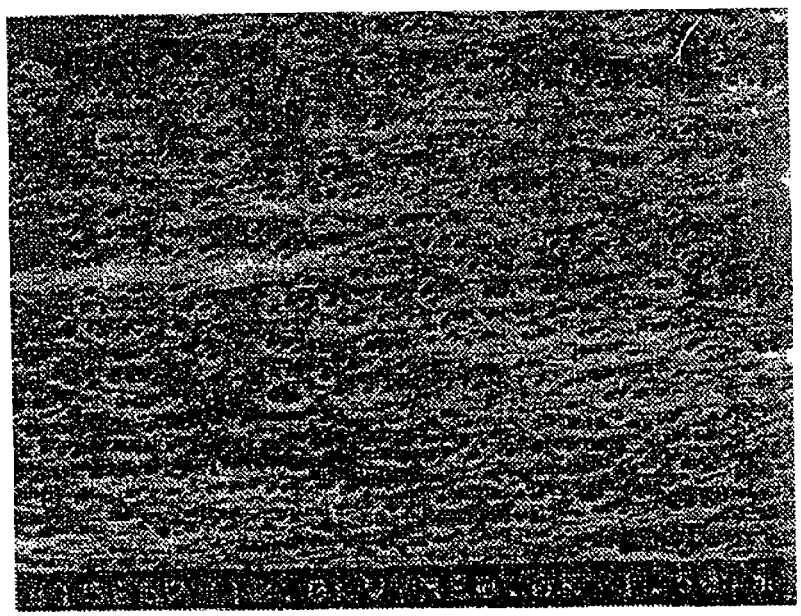
FIG. 8 is a scanning electron microscopic (SEM) photograph of a portion of the gelatin layer of a hologram experimentally manufactured using the post-exposure treatment method according to the present invention.

FIG. 8 is a scanning electron microscopic (SEM) photograph of the emulsion layer taken after the post-exposure treatment in an experiment according to the present invention. As shown in FIG. 8, microvoids appear in the emulsion layer.

An application example performed to verify the effect of the post-exposure treatment method according to the present invention will be described. The inventor manufactured a reflection type HOE for three-color display according to the procedures described above. Hologram recording was carried out using three wavelengths, 647 nm (R), 532 nm (G), and 458 nm (B), for full-color display. To prevent the unnecessary reflection of light during the recording process, the plane of the silver halide emulsion layer was index matched.

Figure 9:
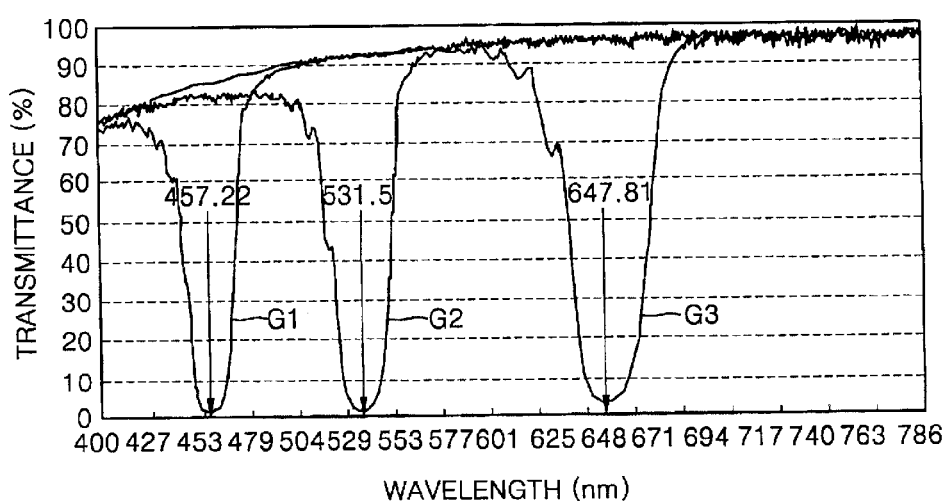
FIG. 9 is a graph of variation in the transmittance of a holographic optical element (HOE) with respect to three wavelengths, which was experimentally manufactured using the post-exposure treatment according to the present invention.

FIG. 9 is a graph showing the transmittance of the 3-color, reflection type HOE with respect to different recording wavelengths, which was measured using a spectrometer. In FIG. 9, G1, G2, and G3 denote variations in the transmittance of recording wavelengths, 458 nm, 532 nm, and 647 nm, respectively.

For all of the graphs G1, G2, and G3, the bandwidth having a minimum transmittance is about 20 nm, and the minimum transmittance is about 1%.

Table 3 shows the reflection efficiency and transmittance of the reflection type HOE measured with laser for three wavelengths of record. As shown in Table 3, for all the wavelengths of record, the efficiency is above 96%, and the transmittance is as low as 0.2–0.8%.

TABLE 3

| Wavelength of Record | Reflection Efficiency | Transmittance |
| --- | --- | --- |
| 458 nm | 96.3% | 0.2% |
| 532 nm | 96.5% | 0.5% |
| 647 nm | 96.8% | 0.8% |

As described above, the HOE actually manufactured using the post-exposure treatment method of silver halide emulsion layer according to the present invention shows better characteristics than conventional HOEs.

These results support that the post-exposure treatment method of holographic recording material described by means of the experiment above can be applied to simple holograms or the application fields of hologram, or to the manufacture of a variety of devices including a variety of optical devices and displays.

For example, the post-exposure treatment method of silver halide emulsion layer according to the present invention has the following applications: devices or systems that is difficult or impossible to manufacture using conventional holographic recording materials such as DCG or photopolymers; transmission and reflection holograms for both monochromic and color display; transmission and reflection HOEs; high-efficiency full-color hologram grating elements; monochromic and color hologram reflectors; edge-lit holograms and edge-lit HOEs; evanescent wave holograms and evanescent wave HOEs; monochromic and color hologram diffusers; monochromic and color hologram screens; color filtering devices; dichroic mirrors or filters; holographic IR optical elements using IR or near IR as exposure light; and holographic IR optical elements operating using light having a wavelength shifted from light of record. Additional applications include optical devices, for example, active optical switching devices, active holograms or active HOEs, compact lasers, or light amplifiers, which are manufactured by filling the microvoids with a material having a different refractive index from gelatin, a bandgap material, or a material working by potential difference, such as liquid crystals.

The experimental example of the present invention described above is for illustrative purpose and not intended to limit the scope of the present invention. For example, it is appreciated by those skilled in the art that the processing conditions in each step of the post-exposure treatment method, for example, treatment solutions or other substances used in each step, can be changed within the scope of the present invention. For example, in the drying process performed using an oven, another type of drier can be used instead of the oven. It will be understood by those skilled in the art that various changes in form and details may be made in the experimental example described above without departing from the spirit and scope of the invention as defined by the appended claims.

As described above, the post-exposure treatment of silver halide emulsion layer according to the present invention can provide the characteristics of silver halide, DCG, and photopolymers because it is based on the conventional silver halide emulsion layer, and provides better spectral sensitivity, energy sensitivity, efficiency, signal-to-noise ratio, long-term reliability than the conventional holographic recording materials. As the post-exposure treatment method of silver halide emulsion layer according to the present invention is applied to the manufacture of holograms, full-color holograms/HOEs, other optical elements, and displays can be manufactured with improved efficiency, signal-to-noise ratio, bandwidth, and long-term reliability.

What is claimed is:

1. A post-exposure treatment method of a silver halide emulsion layer in the manufacture of a hologram, the method comprising:

pre-hardening the silver halide emulsion layer after exposure, wherein the silver halide emulsion layer comprises gelatin;

developing the pre-hardened silver halide emulsion layer using a developer solution;

bleaching the developed silver halide emulsion layer with a bleaching solution;

hardening the bleached silver halide emulsion layer with a hardening agent present in the bleaching solution;

drying the hardened silver halide emulsion layer;

surface-hardening the dried silver halide emulsion layer;

fixing the hardened silver halide emulsion layer;

treating the fixed silver halide emulsion layer using warm water; and drying the silver halide emulsion layer which has been treated using warm water.

2. The post-exposure treatment method of claim 1, wherein, in pre-hardening the silver halide emulsion layer, a mixture of an organic solvent including an aldehyde group, potassium bromide, sodium carbonate, and deionized water in a predetermined ratio is used.

3. The post-exposure treatment method of claim 1, wherein, in pre-hardening the silver halide emulsion layer, a mixture of $(Cr_2 (SO_4)_3.K_2 SO_4)$ or $(Al_2 (SO_4)_3.K_2 SO_4)$; potassium bromide; sodium carbonate; and deionized water is used.

4. The post-exposure treatment method of claim 1, wherein, in bleaching the developed silver halide emulsion layer, a hardening agent of 1–8% for cross-linking gelatin in the silver halide emulsion layer and a rehalogenate-bleaching agent containing a basic substance of 0–5% for the adjustment of pH are used.

5. The post-exposure treatment method of claim 4, wherein the hardening agent is at least one selected from the group consisting of chromium (III) potassium sulfate, $Cr^{3+}$-containing salts, and $Al^{3+}$-containing salts.

6. The post-exposure treatment method of claim 4, wherein the basic substance is borax.

7. The post-exposure treatment method of claim 4, wherein the halogenate-bleaching solution comprises 4-methylaminophenol sulfate, 2,4-diaminophenol dihydrochloride, 1,4-dihydroxybenzene, or resorcinol in an amount of 1–2%.

8. The post-exposure treatment method of claim 1, wherein, in hardening the bleached silver halide emulsion layer, the bleached silver halide emulsion layer is thermally treated to harden gelatin in the bleached silver halide emulsion layer, wherein the bleached silver halide emulsion layer is left in warm water, a high-temperature and high-humidity atmosphere, or a microwave oven for a predetermined period of time to facilitate the cross-linking of the gelatin.

9. The post-exposure treatment method of claim 1, before bleaching the developed silver halide emulsion layer, further comprising treating the developed silver halide emulsion layer in a stop bath using acetic acid for 30–120 seconds.

10. The post-exposure treatment method of claim 8, wherein the bleached emulsion layer is left in a weak alkali warm-water for a predetermined period of time.

11. The post-exposure treatment method of claim 8, wherein the silver halide emulsion layer after the bleaching is thermally treated in a dark room.

12. The post-exposure treatment method of claim 1, wherein drying the hardened silver halide emulsion layer comprises:

treating the hardened silver halide emulsion layer using a 50:50 dilution of an organic solvent and water for 2–3 minutes and then 100% of the organic solution for 2–3 minutes, and drying the resultant structure;

drying the resultant structure in an oven at 45° C. for 5 minutes.

13. The post-exposure treatment method of claim 12, wherein the organic solvent is ethanol or IMS (Industrial Methylated Spirit).

14. The post-exposure treatment method of claim 1, wherein, in surface-hardening the dried silver halide emulsion layer, the surface of the dried silver halide emulsion layer is thermally treated after surface coating of the dried silver halide emulsion layer using one of an aldehyde-containing solution and a metol- or quinol-containing organic solvent for a predetermined period of time, or is thermally treated within a sealed container under the atmosphere of a vapor of the aldehyde-containing solution or metol- or quinol-containing solution for a predetermined period of time.

15. The post-exposure treatment method of claim 1, wherein, in surface-hardening the dried silver halide emulsion layer, the surface of the dried silver halide emulsion layer is coated with one of an aldehyde-containing solution and a metol- or quinol-containing organic solvent and then thermally treated using a microwave oven for a predetermined period of time.

16. The post-exposure treatment method of claim 1, wherein, in fixing the hardened silver halide emulsion layer, a 2–10% dilution of a fixing solution is used to form microvoids.

17. The post-exposure treatment method of claim 16, wherein the fixing solution comprises one selected from the group consisting of ammonium thiosulfate, sodium thiosulfate, ammonium thiocyanate, and a 1:2–2:20 dilution of ILFORD rapid, and an anti-swelling agent for suppressing collapsing of the microvoids and swelling of gelatin.

18. The post-exposure treatment method of claim 1, wherein, in treating the fixed silver halide emulsion layer using warm water, the fixed silver halide emulsion layer is treated using warm water of 30–80° C. for 1–10 minutes.

19. The post-exposure treatment method of claim 16, wherein drying the silver halide emulsion layer which has been treated with warm water comprises:

sequentially treating the silver halide emulsion layer which has been treated with warm water using a mixed organic solvent, pure organic solvent, and high-temperature organic solvent not less then 70° C.; and slowly exposing the treated silver halide emulsion layer to air so that water remaining in the microvoids and gelatin of the silver halide emulsion layer is displaced by air.

20. The post-exposure treatment method of claim 19, wherein the mixed organic solvent comprises 40–80% of an organic solvent and 60–20% of water.

21. The post-exposure treatment method of claim 19, wherein when water and the organic solvent remain in the microvoids, the silver halide emulsion layer that has been exposed to air is dried in an oven not less than 40° C. for a predetermined period of time, to completely remove water and the organic solvent remaining in the microvoids.

22. The post-exposure treatment method of claim 19, wherein when water and the organic solvent remain in the microvoids, the silver halide emulsion layer that has been exposed to air is dried in a vacuum oven for a predetermined period of time, to completely remove water and the organic solvent remaining in the microvoids.

23. The post-exposure treatment method of claim 19, wherein the organic solvent is isopropanol.

24. The post-exposure treatment method of claim 19, after drying the silver halide emulsion layer which has been treated with warm water, further comprising coating the surface of exposed gelatin with solvent-free epoxy or UV curable cement.

25. The post-exposure treatment method of claim 19, after drying the silver halide emulsion layer which has been treated with warm water, further comprising sealing the surface of exposed gelatin with glass, polyester, acrylic, or triacetate film.

26. The post-exposure treatment method of claim 1, wherein, in drying the hardened silver halide emulsion layer, an exposed portion of the hardened silver halide emulsion layer swells a predetermined extent so as to shift the wavelength of reproducing light by a predetermined amount with respect to the wavelength of recording light for a hologram.

27. A hologram comprising a silver halide emulsion layer treated using the post-exposure treatment method of claim 1.

28. The hologram of claim 27, being selected from the group consisting of transmission and reflection holograms for both monochromic and color display, an edge-lit hologram, and an evanescent wave hologram.

29. The hologram of claim 27, wherein microvoids of the hologram are filled with a material having a different refractive index from gelatin, a bandgap material, or a material working by potential difference.

30. A holographic optical element comprising a hologram having a silver halide emulsion layer treated using the post-exposure treatment method of claim 1.

31. The holographic optical element of claim 30, being selected from the group consisting of an edge-lit holographic optical element, an evanescent wave holographic optical element, and transmission and reflection holographic optical elements.

32. A monochromic or color holographic reflector in which an exposed silver halide emulsion layer is treated using the post-exposure treatment method of claim 1.

33. A monochromic or color holographic diffuser in which an exposed silver halide emulsion layer treated using the post-exposure treatment method of claim 1.

34. A holographic screen in which an exposed silver halide emulsion layer is treated using the post-exposure treatment method of claim 1.

35. A color filtering element in which an exposed silver halide emulsion layer is treated using the post-exposure treatment method of claim 1.

36. A dichroic mirror in which an exposed silver halide emulsion layer is treated using the post-exposure treatment method of claim 1.

37. A holographic infrared optical element comprising a hologram having a silver halide emulsion layer treated using the post-exposure treatment method of claim 1, the holographic infrared optical element using an infrared or near infrared laser as recording light.

38. A holographic optical element comprising a hologram having a silver halide emulsion layer treated using the post-exposure treatment method of claim 1, wherein light wavelength-shifted from recording light by a predetermined amount is used as reproducing light.

39. The holographic optical element of claim 38, wherein the recording light is a red laser beam, and the reproducing light is an infrared or near infrared ray.

40. An active optical switching device comprising a hologram having a silver halide emulsion layer treated using the post-exposure treatment method of claim 1, microvoids of the hologram being filled with a material having a different refractive index from gelatin, a bandgap material, or a material working by potential difference.

41. The active optical switching device of claim 40, wherein the material working by potential difference is liquid crystals.

42. An active holographic optical element comprising a hologram having a silver halide emulsion layer treated using the post-exposure treatment method of claim 1, microvoids of the hologram being filled with a material having a different refractive index from gelatin, a bandgap material, or a material working by potential difference.

43. A laser device comprising a hologram having a silver halide emulsion layer treated using the post-exposure treatment method of claim 1, microvoids of the hologram being filled with a material having a different refractive index from gelatin, a bandgap material, or a material working by potential difference.

44. A light amplifier comprising a hologram having a silver halide emulsion layer treated using the post-exposure treatment method of claim 1, microvoids of the hologram being filled with a material having a different refractive index from gelatin, a bandgap material, or a material working by potential difference.

45. The post-exposure treatment method of claim 20, wherein the organic solvent is isopropanol.

46. The post-exposure treatment method of claim 21, wherein the organic solvent is isopropanol.

47. The post-exposure treatment method of claim 22, wherein the organic solvent is isopropanol.

* * * * *